(12) United States Patent
Brjazovski et al.

(10) Patent No.: US 8,156,507 B2
(45) Date of Patent: Apr. 10, 2012

(54) USER MODE FILE SYSTEM SERIALIZATION AND RELIABILITY

(75) Inventors: Arkadi Brjazovski, Redmond, WA (US); Rohan Kumar, Redmond, WA (US); Cristian Diaconu, Kirkland, WA (US); Oleksandr Gololobov, Redmond, WA (US); Mahesh K. Sreenivas, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1206 days.

(21) Appl. No.: 11/608,703

(22) Filed: Dec. 8, 2006

(65) Prior Publication Data

US 2008/0141260 A1 Jun. 12, 2008

(51) Int. Cl.
G06F 3/00 (2006.01)
G06F 9/44 (2006.01)
G06F 9/46 (2006.01)
G06F 13/00 (2006.01)

(52) U.S. Cl. ...................................................... 719/319

(58) Field of Classification Search .................... 719/319
See application file for complete search history.

(56) References Cited

U.S. PATENT DOCUMENTS

| | | | | |
|---|---|---|---|---|
| 5,129,086 A * | 7/1992 | Coyle et al. | ................. | 719/328 |
| 5,584,023 A * | 12/1996 | Hsu | ........................ | 1/1 |
| 6,339,793 B1 | 1/2002 | Bostian | | |
| 6,665,814 B2 | 12/2003 | Hobson | | |
| 6,856,993 B1 | 2/2005 | Verma | | |
| 7,478,388 B1 * | 1/2009 | Chen et al. | ........................ | 718/1 |
| 2002/0023122 A1 * | 2/2002 | Polizzi et al. | ................. | 709/202 |
| 2002/0169830 A1 * | 11/2002 | Mild et al. | ..................... | 709/203 |
| 2005/0039049 A1 | 2/2005 | Chang | | |
| 2005/0091214 A1 | 4/2005 | Probert | | |
| 2005/0234867 A1 | 10/2005 | Shinkai | | |
| 2006/0047685 A1 | 3/2006 | Dearing | | |
| 2006/0116985 A1 | 6/2006 | Thind | | |
| 2006/0117056 A1 | 6/2006 | Havewala | | |
| 2006/0190469 A1 | 8/2006 | Kathuria | | |

OTHER PUBLICATIONS

Steven R. Soltis, et al. The Global File System: A File System for Shared Disk Storage. http://ds.informatik.uni-marburg.de/de/teaching/ws0405/seminar-bs/soltis97global.pdf. Last accessed Sep. 14, 2006. The Regents of the University of Minnesota, 1997, pp. 1-40.
Peter, Reiher, et al., Resolving File Conflicts in the Ficus File System. http://scholar.google.com/scholar?hl=en&q=cache:3NXpTBTMhSsJ;gost.isi.edu/~johnh/PAPERS/Reiher94a.pdf+file+system+namespace+synchronization. Proceedings of the Summer USENIX Conference, Jun. 1994, pp. 183-195.
Eugene Tsyrklevich, et al. Dynamic Detection and Prevention of Race Conditions in File Accesses. http://scholar.google.com/scholar?hl=en&lr=&q=cache:K19Ziw3B_8wJ:immunix.org/~crispin/yee+namespace+serialization. Last accessed Sep. 14, 2006.

* cited by examiner

*Primary Examiner* — Lechi Truong
*Assistant Examiner* — Timothy A Mudrick
(74) *Attorney, Agent, or Firm* — Workman Nydegger

(57) ABSTRACT

An operating system is provided. The system includes an agent component to monitor computer activities between one or more single-item access components (SIAC) and one or more set-based access components (SBAC). An interface component is employed by the agent component to process kernel mode requests from a user mode application when communicating with a storage platform. Re-try components can be provided to facilitate cooperation between the SIAC and the SBAC.

14 Claims, 10 Drawing Sheets

USER MODE FILE SYSTEM SERIALIZATION AND RELIABILITY

BACKGROUND

Operating systems and the applications that run on them have many tasks to perform which are sometimes difficult to achieve without having conflicts between one type of application and another. At the simplest level, an operating system is responsible for two basic aspects, whereby the system manages the hardware and software resources of the system. In a desktop computer, these resources include such components as the processor, memory, disk space, and so forth, whereas on a cell phone, the resources include the keypad, the screen, the address book, the phone dialer, the battery and the network connection, for example. The operating system should provide a stable, consistent way for applications to interact with computer hardware without having to be concerned with all the details of the respective hardware.

The first task of the operating system, managing hardware and software resources, is very important, as various programs and input methods compete for the attention of the central processing unit (CPU) and demand memory, storage and input/output (I/O) bandwidth for differing purposes. In this capacity, the operating system plays the role of the system manager, making sure that each application receives the necessary resources while properly interacting with all the other applications, as well as monitoring the limited capacity of the system to the greatest benefit possible of all the users and applications. This often requires balancing needs between competing applications.

The second task of the operating system, providing a consistent application interface, is especially important if there is to be more than one of a particular type of computer using the operating system, or if the hardware making up the computer is open to change. Thus, a consistent application program interface (API) allows a software developer to write an application on one computer and have a high level of confidence that it will run on another computer of the same type, even if the amount of memory or the quantity of storage is different on the two machines, for example. Even if a particular computer is unique, the operating system can ensure that applications continue to run when hardware upgrades and updates occur. This is by design since the operating system and not the application is charged with managing the hardware and the distribution of its resources.

Within the broad family of operating systems, there are generally four types, categorized based on the types of computers they control and the sort of applications they support. These categories can include:

Real-time operating system (RTOS)—Real-time operating systems are used to control machinery, scientific instruments and industrial control systems. An RTOS typically has very little user-interface capability, and generally no end-user utilities, since the system will be considered an embedded system when delivered for use. An important part of the RTOS is managing the resources of the computer so that a particular operation executes in about the same amount of time every time it occurs. For example, in a complex machine/controller scenario, having a part move more quickly because system resources are available may be just as catastrophic as having it not move at all due to the system being busy.

Another type of operating system includes single-user, single task. As the name implies, this operating system is designed to manage the computer so that one user can effectively do one thing at a time. The Palm OS for Palm handheld computers is but one example of a modem single-user, single-task operating system.

Similarly, a single-user, multi-tasking system may be provided. This is the type of operating system most people use on their desktop and laptop computers today. The most popular of these are Microsoft's Windows and Apple's MacOS platforms that are both examples of operating systems that allow a single user to have several programs in operation at the same time. For example, it's common for a user to be writing a note in a word processor while downloading a file from the Internet while printing the text of an e-mail message.

Multi-user is till yet another type of operating system. A multi-user operating system allows many different users to take advantage of the computer's resources simultaneously. The operating system must make sure that the requirements of the various users are balanced, and that each of the programs they are using has sufficient and separate resources so that a problem with one user doesn't affect the entire community of users. Some examples include Unix, VMS and mainframe operating systems, such as MVS.

With respect to single-user, multi-tasking systems, conflicts can exist for applications that were created under previous designs of the operating systems and in view of newer designs. Thus, these applications often follow the rules of the previous designs from an operational standpoint yet still need to operate with newer systems, applications, and contexts. In one example, current or legacy "File Systems" generally only support a single-item access API to create/modify/read file/directory data. However, newer, richer storage platforms may employ multi-item access rules and expose additional API sets which can be used to create/modify/read manipulate file/directory data as well. Given this requirement between older and newer applications running on the same system, there is a need to facilitate cooperation between such applications.

One area where differences exist between older and newer platform operations include synchronization and serialization processing. For example, if two threads were trying to create the same file name concurrently, one thread should have success creating the file and the other thread should fail—possibly generating an error message. Operating system components monitor such activities and arbitrate when conflicts exist. In previous platforms, such synchronization logic was provided in what is referred to as kernel mode which is also related to another operating system state referred to as user mode. For instance, to avoid having applications that constantly crash, newer operating systems were designed with at least two different operating modes referred to as kernel mode and user mode. Kernel mode refers to logic that controls how the machine operates with critical data structures, direct hardware (IN/OUT or memory mapped), direct memory, IRQ, DMA, and so forth. User mode is more of a virtual execution environment and executes applications designed for the machine but is generally prevented access to key hardware operations. Due to design differences with newer platform architectures, it is exceedingly difficult to implement reliable synchronization and serialization logic in kernel mode.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Interface components are provided that allow transparent operations between legacy applications that were designed under previous operating system platforms and components that operate in modern platform architectures. The interface components which can be provided via a user mode agent maintains compatibility between legacy applications that operate under one set of rules such as how files are created and how success or failure is achieved when creating such files. This includes the ability to concurrently support application programming interfaces (APIs) that are utilized by the legacy applications and newer APIs that are supported by the modern platforms. In addition, modem platform architectures which are modeled after database server storage capabilities provide logic to process various system events (e.g., kernel mode requests) in user mode. The interface components allow legacy style applications (e.g., handle-based applications) to transparently operate as expected under previous operating system constraints (e.g., process kernel mode requests in kernel mode) yet employ the available user mode logic supplied by the modern platform when servicing application requests.

In general, platform components such as drivers are executed in kernel mode. This could include logic such as for arbitrating between driver requests in kernel mode, where kernel mode refers to the ability to communicate and control machine-sensitive components. In user mode, applications are prevented from accessing such machine-sensitive components or memory locations. The interface components provide a bridge between components that are operative in user mode and operations that are supported or generated in kernel mode. For example, if two or more kernel mode requests were generated to create a given file name, the interface components receive the requests and pass these on to user mode components for subsequent processing.

In another aspect, the agent component supports operations that are provided to bridge synchronization functionality between previous operating system platforms and modern architectures. Previous applications (e.g., handle-based applications) were developed under the constraint that stored data items would be accessed a single item at a time, i.e., no other component in the system would also be accessing the same item when it was already being accessed by another component. Modern systems have developed a richer architecture whereby multiple data items can be accessed concurrently. Operations supported by the agent provide concurrent processing support for previous systems and modern versions operating on the same platform. For example, the agent operations support file close operations that may have been allowed with error messages in modern versions but were not supported or expected in the previous applications. In one example, file re-try operations continues file activities such as save or close until a time that is suitable to the respective system or application.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 8 illustrates example system processing considerations.

DETAILED DESCRIPTION

Interfaces and re-try components are provided that enable applications developed under one operating system framework to interact with applications developed under another framework. In one aspect, an operating system is provided. The system includes an agent component to monitor computer activities between one or more single-item access components (SIAC) and one or more set-based access components (SBAC). An interface component is employed by the agent component to process kernel mode requests from a user mode application when communicating with a storage platform. Re-try components can be provided to facilitate cooperation between the SIAC and the SBAC.

As used in this application, the terms "component," "item," "interface," "agent," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
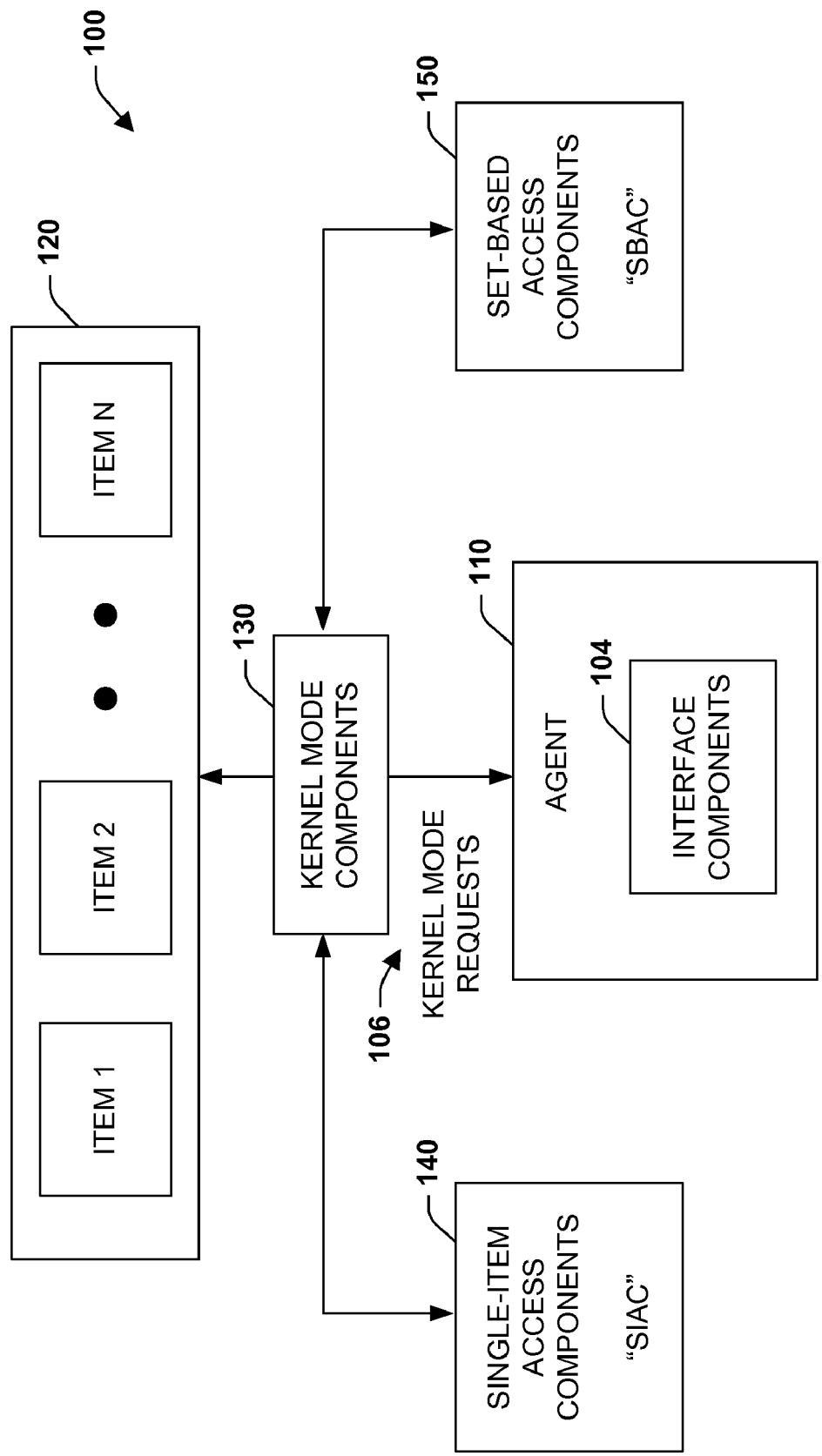
FIG. 1 is a schematic block diagram illustrating an interface for processing kernel mode requests and support for multiple operating systems.

Referring initially to FIG. 1, a system 100 illustrates interface components 104 for processing kernel mode requests 106 and provides support for multiple operating systems. The system 100 includes an agent 110 that is employed to monitor and control access to one or more data items 120. This is achieved by utilizing the interface components 104 to process the requests 106 in user mode while the requests are generated in kernel mode. In general, the requests 106 can be substantially any kernel mode operation executed by one or more kernel mode components 130 that is processed by the agent 110 and which is executed via user mode processes. The data items 120 can be substantially any type of data structure including single memory locations, arrays, files, directories, applications, relational database structures, objects, classes, methods, functions, and so forth.

As shown, one type of system or application to operate on the data items 120 includes one or more single-item access components 140 (also referred to by acronym SIAC). Such SAIC 140 are known for being able to operate and process one data item 120 at a time and can also be referred to as handle-based systems (e.g., Win32). A handle is generally a variable that identifies an object and provides an indirect reference to an operating system resource. A handle can be variable of type long which uniquely identifies any object such as forms, desktop items, menus, or in other words a handle is a unique identifier for each of these objects. Typically application windows in an SIAC 140 operating system are identified by a handle. For example, a desktop window can have a handle, a Visual Basic form displayed in an application can have a handle, and even the controls on a form, which are themselves actually windows, can have respective handles.

Handle-based applications or the SIAC 140 can have difficulty with applications that support other protocols such as one or more set-based access components 150 (also referred to by acronym SBAC) that may also access the data items 120. Set-based access components 150 can be associated with a different style of operating system framework that allows multiple data items 120 to be accessed concurrently. Thus, the SBAC 150 can cause problems for the SIAC 140 when both types of applications are attempting access to the data items 120 in a concurrent manner. Generally, set-based access is associated with operating systems (e.g., WINFS) adapted with relational database capabilities that allow multiple data items 120 to be accessed.

Generally, the kernel mode components 130 and requests 106 are associated with the SBAC 150. The interface components 104 allow the requests 106 to be processed in user mode via the agent 110. In one example, current "File Systems" associated with the SIAC 140 may have their namespace synchronization logic in the kernel mode as supported by the kernel mode components 130. An example of such synchronization includes two or more threads which are attempting to create the same filename, where controls cause one of the threads to succeed and the other to fail since the filename may already exist. The SBAC 150 may have difficulty implementing this solution in the kernel mode since a backing store (component employed by SBAC) is a user mode process. Also, providing this logic in the kernel mode may be exceedingly difficult. Thus, the agent 110 provides the interface components 104 to process kernel mode requests 106 yet implement its respective logic in the user mode.

The interface components 104 maintain compatibility for legacy applications such as the SIAC 140 that operate under one set of rules such as how files are created and how success or failure is achieved when creating such files. This includes the ability to concurrently support application programming interfaces (APIs) that are utilized by the SIAC 140 and newer APIs that are supported by the modern platforms. In addition, modern platform architectures which are modeled after database server storage capabilities provide logic to process various system events (e.g., kernel mode requests 106) in user mode. The interface components 104 allow legacy style applications (e.g., handle-based applications) to transparently operate as expected under previous operating system constraints yet employ the available user mode logic supplied by the modern platform when servicing application requests.

In another aspect, one or more re-try components (not shown) can operate on a CLOSE or other type operation to facilitate reliable operations between the SIAC 140 and the SBAC 150. Thus, saving changes to the SIAC 140 can fail if an SBAC 150 API is actively operating on the same file. Generally, the SIAC 140 does not expect CLOSE (or other operation to fail). The re-try components account for differing file or directory operating system differences between the SIAC 140 and the SBAC 150 and maintains operations accordingly as will be described in more details below. Such re-try processing aspects are described in further detail with respect to FIGS. 6-8. In another aspect, the system 100 processes kernel mode requests. This includes means for generating one or more kernel mode requests (kernel mode components 130) during file or directory operations and means for processing the kernel mode requests (agent component 110, interface components 104) according to a user mode task or procedure.

Figure 2:
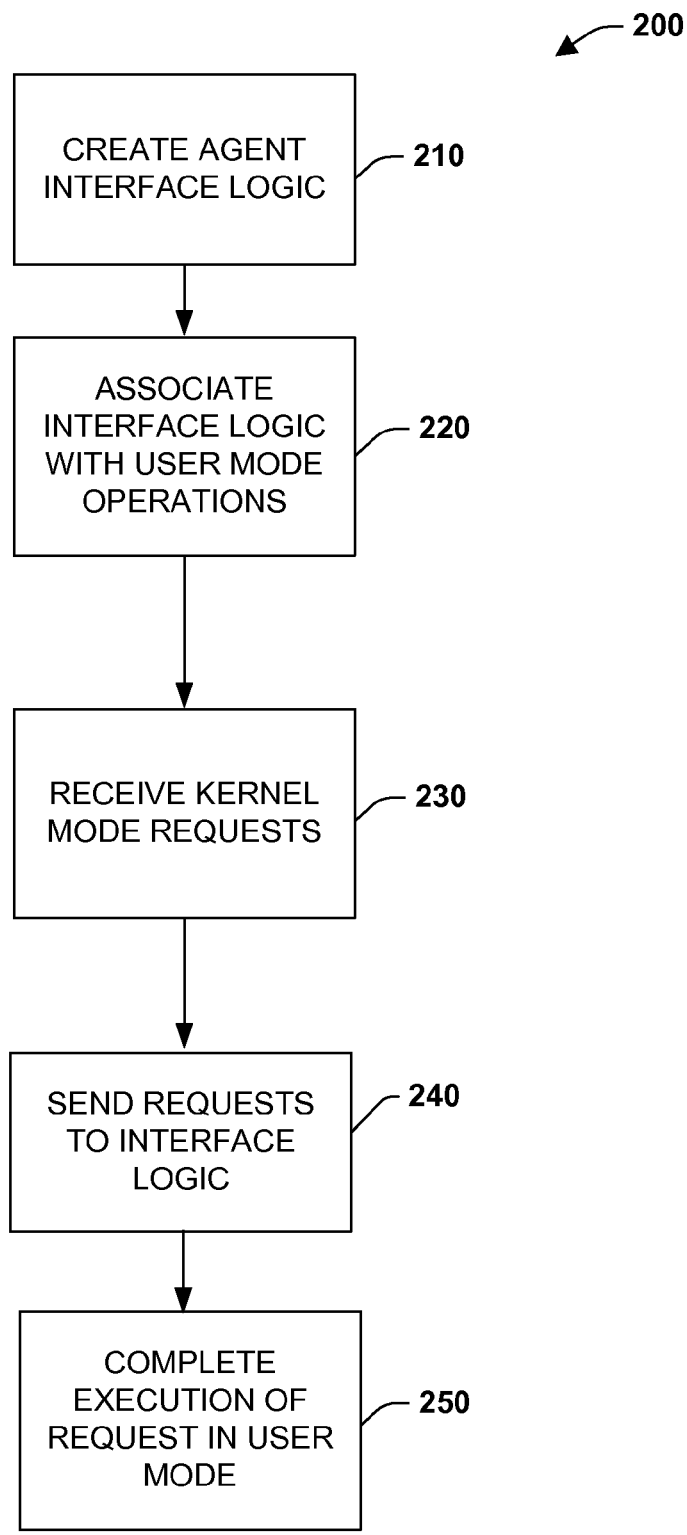
FIG. 2 is a flow diagram that illustrates an interface process for kernel mode requests.

FIG. 2 illustrates exemplary interface process 200 for kernel mode requests. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 210 of FIG. 2, agent interface logic is created. This can include logic for how data access is controlled, denied, allowed, and so forth between single-item access components (SIAC) and set-based access components (SBAC). At 220, the agent interface logic defined at 210 is associated with user mode operation. This can include initialization code and application code that is restricted to user mode execution processes. For example, such restriction could include having no memory pointers or interfaces call into kernel mode processes or addresses when executing. At 230, the agent operating in user mode can be employed to receive kernel mode requests from the interfaces created at 210. This can include interrupt and thread processes that are invoked when a kernel mode requests have been generated. For example, a kernel mode request could be initiated as an interrupt, where the agent interface detects the interrupt and conducts further processes from user mode. There can also data passed from the kernel mode requests to allow proper operation of the user mode processes.

At 240, the requests received at 230 are sent to the user mode application components for further processing. This can include processing/logic that controls how file and directories are opened, closed, saved, cached, and so forth between differing operating rules associated with the SIAC and the SBAC. At 250, the user mode components complete execution of the kernel mode requests. This can include invoking interfaces that send acknowledgement to one or more kernel mode components that the respective user mode processing has completed. This can also include intermediate handshaking such as still processing user mode or user mode processing percentage completed and so forth, for example.

Figure 3:
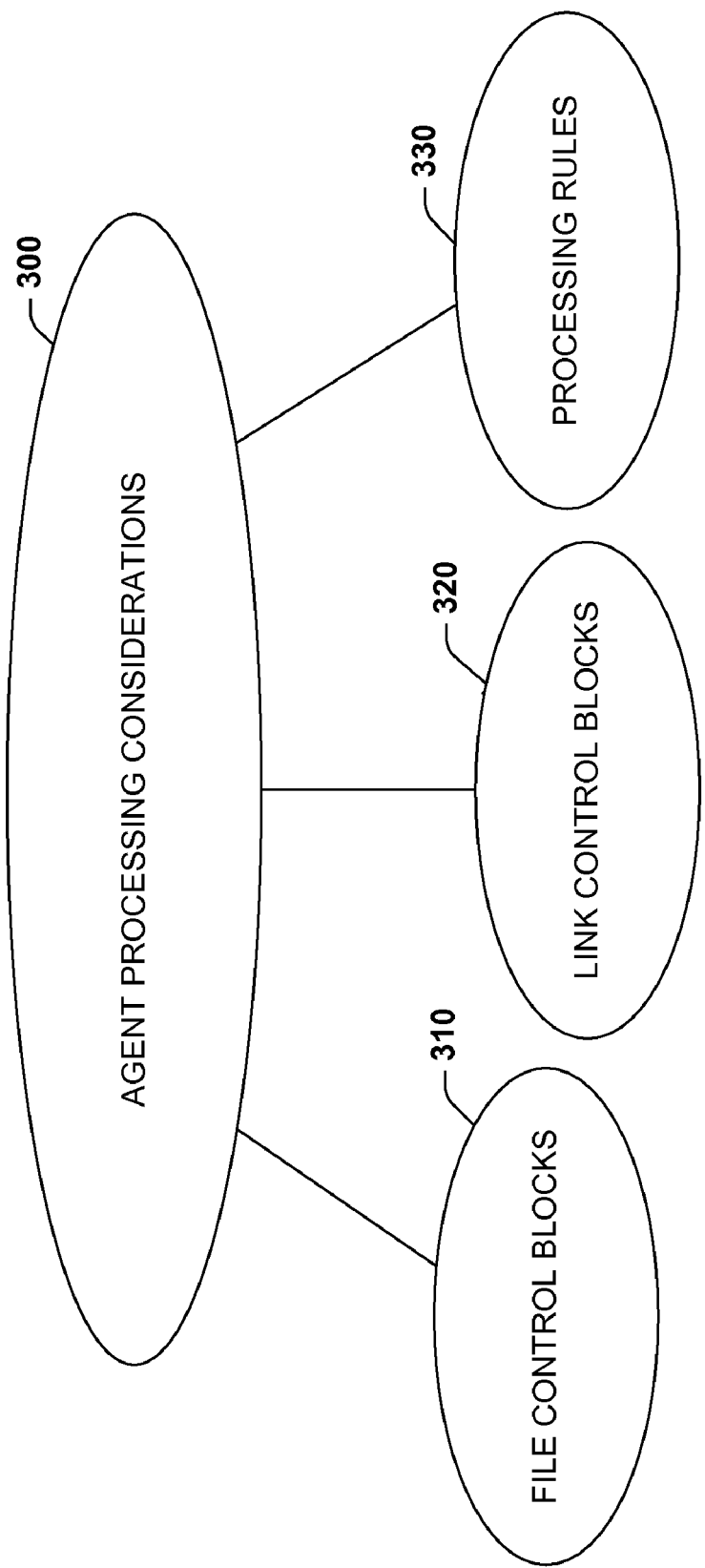
FIG. 3 is a diagram that illustrates an example agent processing considerations.

Referring now to FIG. 3, an example agent processing considerations 300 are illustrated. In one aspect, an agent maintains a set of data structures in memory to cache file or directory metadata. These data structures can be employed for active handles and can be stored in caches after the handle is closed to speed up potential access to the same file/directory in future accesses. The data structures include a File Control Block (FCB) 310 to store properties of a file or directory such as time stamps, file attributes, file names and so forth. The FCB 310 can also maintain the number of handles opened. Generally, FCBs 310 are identified by Item IDs, for example. At 320, one or more Link Control Blocks (LCB) can be employed to map a path name to the appropriate FCB 310. The LCBs 320 can be identified by absolute path names, for example.

When an item is updated via a Store API for example which can be employed to update a database, data in the agent caches may become stale. To facilitate that agent caches are coherent between systems, the following set of rules can be defined at 330:

Store API requests cache invalidation if an item is updated/deleted/renamed via Store API.

When a cache invalidation request is received by the agent, it determines whether to invalidate (expunge) the appropriate cache entries (if they are not in use, i.e. there are no open handles), or fails the request if the entry is in use.

Invalidation of a directory implies invalidation of a sub-tree and it is generally not allowed if any of its children is in use (opened via SIAC application).

The Store API noted above uses Item Id to identify the item(s) being updated/deleted/renamed, for example. This is suitable for the agent in cases except when a directory is being renamed. In this case, the Store API passes the Item ID of the directory and a flag indicating a recursive operation to a cache invalidation routine, for example. The cache invalidation routine determines cache entries which represent substantially all children (not only the immediate ones) of the given directory and attempts to invalidate them. Thus, the agent should maintain the parent-child relationship between cache entries to be able to enumerate the whole sub-tree.

One solution could be to organize the LCBs 320 into a tree with each LCB pointing to its parent (in the namespace hierarchy) and LCBs representing directories maintaining the list of immediate children. Thus, when a file/directory was opened, the agent located/created LCBs 320 for each component in the given path and maintained links between them. However such design may have problems. Intermediate components might not be opened thus their Item IDs are not known for the agent. For example, if an SIAC client opens a file "\foo\bar", the agent may create three LCBs at 320: "\", "\foo" and "\foo\bar." Typically, only the LCB 320 corresponding to the path "\foo\bar" gets mapped to an FCB 310 since this is the item being opened and metadata for this item is retrieved from the store. At the end, the agent has at least two or more dummy LCBs 320 without knowing IDs of the items they correspond to, plus one full-blown LCB that points to the appropriate FCB 310. If at this moment an invalidation request for "\foo\bar" is received (Store API passes the corresponding Item ID, not the "\foo\bar" path), the agent can handle it correctly since it knows this Item ID and can locate the appropriate FCB 310. However, if a component tries to rename the item "\foo" via Store API, the agent may receive the "\foo"'s ItemID which is unknown to it. Since unknown means "not in the cache" which in turn means "not used by SIAC clients", the agent may incorrectly allow Store API to rename "\foo" while "\foo\bar" might potentially be opened by an SIAC client.

A solution for such conflicts can be based on the following principles:

When a file or directory is opened, the agent requests not only the Item ID of the file/directory being opened, but Item IDs of all/other components in the path as well.

The agent locates FCBs 310 of intermediate components in the path or creates dummy FCBs for those components that are not in the cache. Dummy FCBs 310 are considered those that do not have information about the corresponding item except its Item ID. This approach allows a system to enumerate the whole sub-tree underneath the given directory thus solving the issue that the "LCB tree" approach may suffer from.

Figure 4:
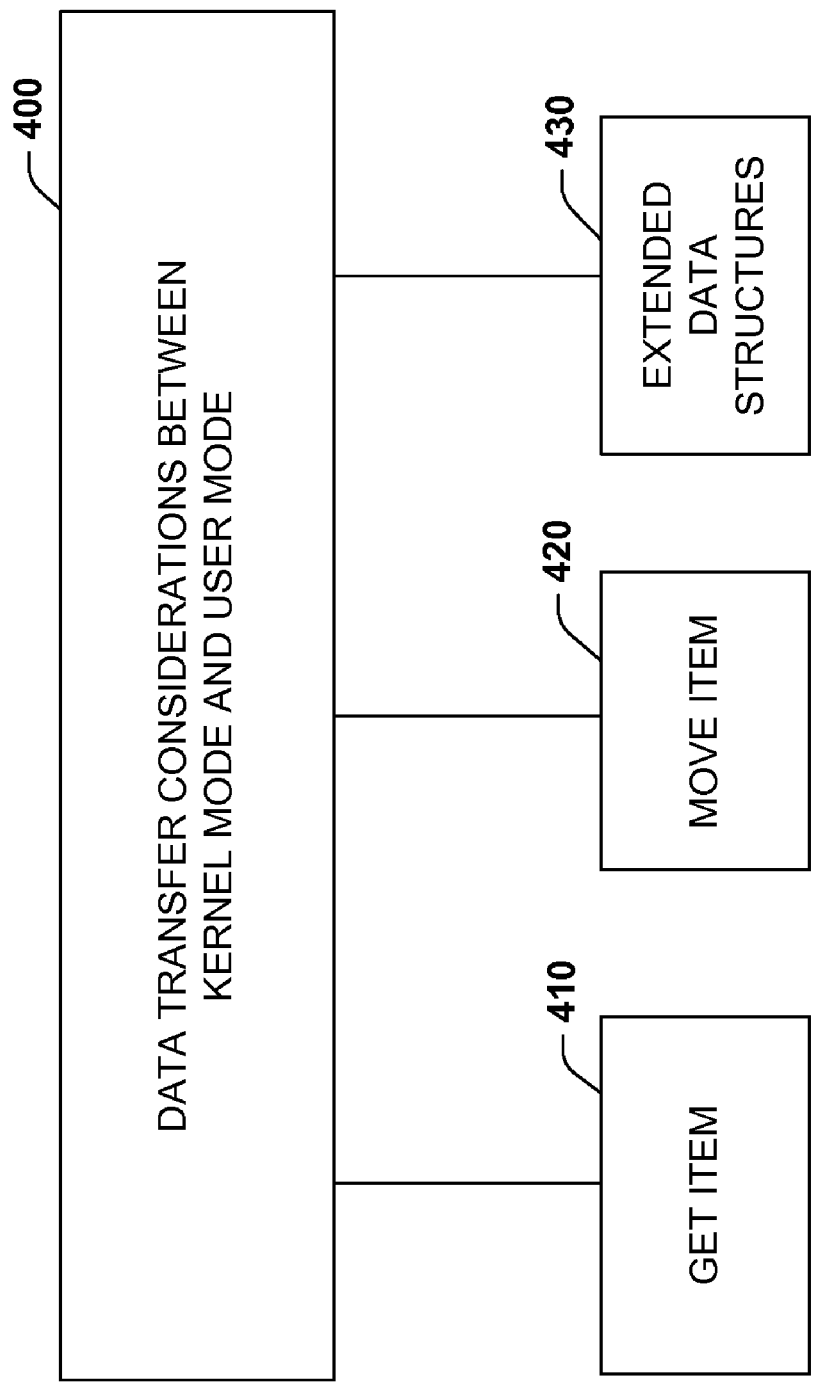
FIG. 4 illustrates example data transfer considerations between kernel mode and user mode.

Turning to FIG. 4, example data transfer considerations 400 between kernel mode and user mode are illustrated. Proceeding to 410, one or more get item aspects are considered. In general, the get item 410 is a procedure that is called by the agent to retrieve the required metadata for the given file/directory from the data store. In one implementation, the procedure returns only Item IDs of the item itself and its immediate parent. According to another aspect, the procedure returns Item IDs of all parents up to the root. Item IDs are returned in a blob (large binary object) containing a set of fixed-length records (Item IDs) with the root's Item ID being the first one of the set. In some cases, the agent does not need the list of container IDs since it already has determined them (if any of siblings of the given file/directory were opened recently and all container IDs are in the cache). In such cases, the get item 410 does not need to build the list of IDs. Moreover, the agent can provide the immediate parent's ID so the get item can have higher performance in this case.

At 420, move item aspects are considered. Move items 420 are procedures that are called by the agent when a file or a directory is being moved or renamed via an SIAC interface. One implementation of this is where the procedure returns only Item IDs of the item itself and its immediate parent. According to another aspect, the procedure returns Item IDs of all parents up to the root. Item IDs can be returned in at least one blob containing a set of fixed-length records (Item IDs) with the root's Item ID being the first one in the set. As in the get item case of 410, the agent may know the destination container ID. This allows a similar optimization where the destination container ID is accepted as an input parameter and thus skipping possible internal lookups. Similar to above in FIG. 3, an FCB (File Control Block) data structure 430 can be extended to include at least one pointer to a parent FCB or null in the case of a root FCB.

Figure 5:
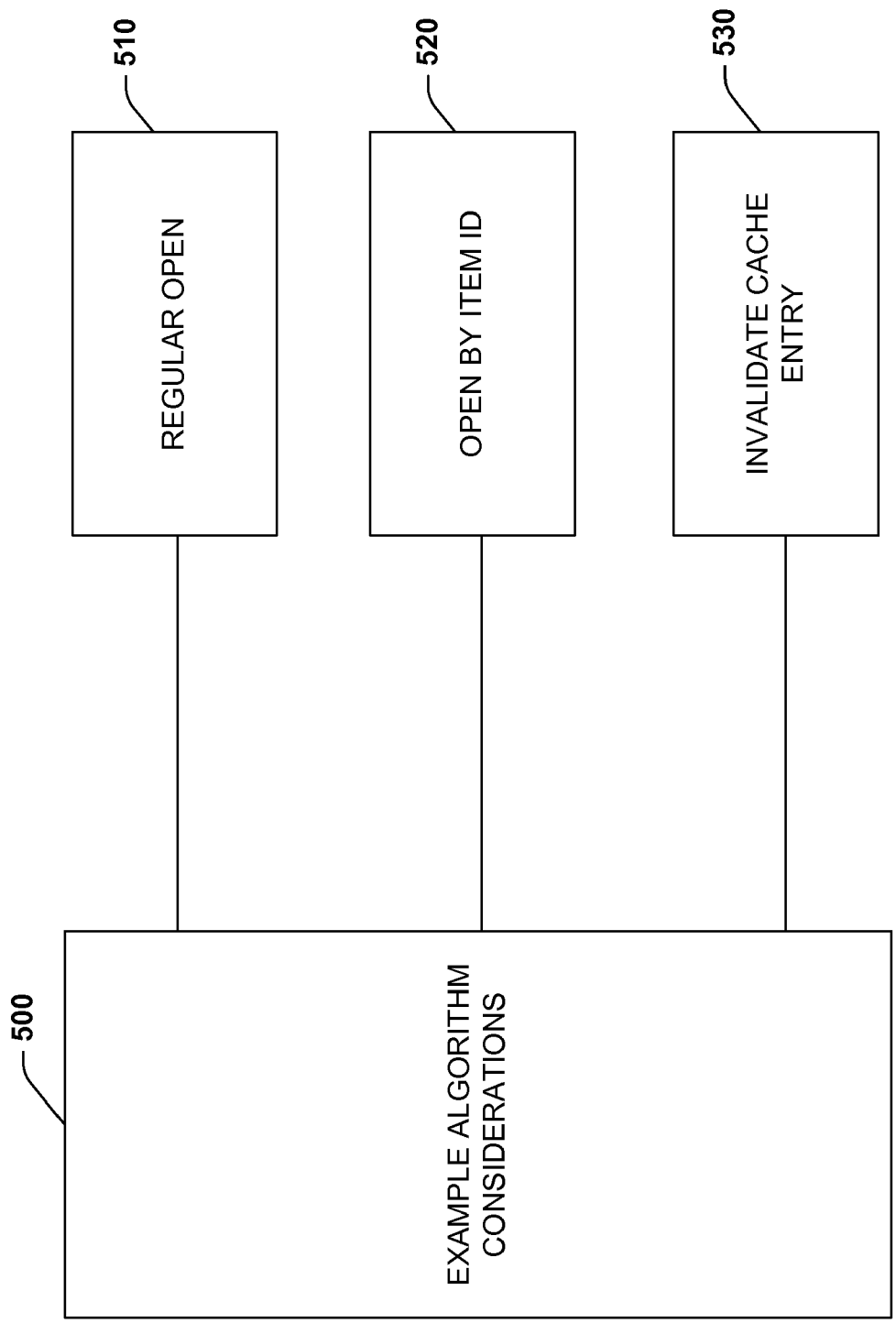
FIG. 5 illustrates example algorithms for kernel mode processing in user mode.

Referring FIG. 5, example algorithms 500 for kernel mode processing in user mode can be provided. At 510, regular file open aspects are considered. For example, when a file "\foo\bar\text.doc" is being opened, the agent attempts to locate the corresponding LCB in the cache. If the LCB is not found, the agent tries to locate the parent's LCB ("\foo\bar"). In either case, the agent calls a get item procedure requesting metadata for "\foo\bar\text.doc." In the case when the "foo\bar" LCB was found and referenced an FCB, the corresponding Item ID is passed to get item as the container ID to reduce the number of lookups this procedure performs. Upon return from the get item procedure, the file's Item ID is known so the agent creates an FCB (and FCBs for all parents if they had not been created before). Each FCB is inserted into the parent's list of children and the pointer to the parent FCB is stored in the child FCB effectively creating a tree representing the namespace hierarchy with extra pointers from child leaves to parent nodes.

At 520 of FIG. 5, Open By Item IDs (OBID) are considered. In the case of an OBID name, the agent performs a similar set of operations as in the case of regular opens except the attempt to locate the parent's LCB because OBID path does not include namespace hierarchy information.

At 530, invalidate cache entries are considered. In general, the ID of the item being invalidated is passed to an Invalidate Cache Entry routine. This routine performs lookup in the FCB cache. If no FCB is found, it can be assumed that the file/directory is not used by SIAC clients and the Invalidate Cache Entry routine then returns success. If the FCB is found, the Invalidate Cache Entry routine checks the number of open handles and fails if it is not zero. If the Invalidate Cache Entry routine is called in recursive mode, it enumerates immediate children of this FCB, checks if there are open handles and fails in this case. If any of the immediate children are directories, the Invalidate Cache Entry routine continues this process until the hierarchy is enumerated and succeeds if there are no open handles. Typically, each FCB is checked by the Invalidate Cache Entry routine and is removed from the cache (if it is not in use). Proceeding to FIGS. 6-8, alternative aspects are presented where re-try logic is provided to facilitate operations between SIAC and SBAC components.

Figure 6:
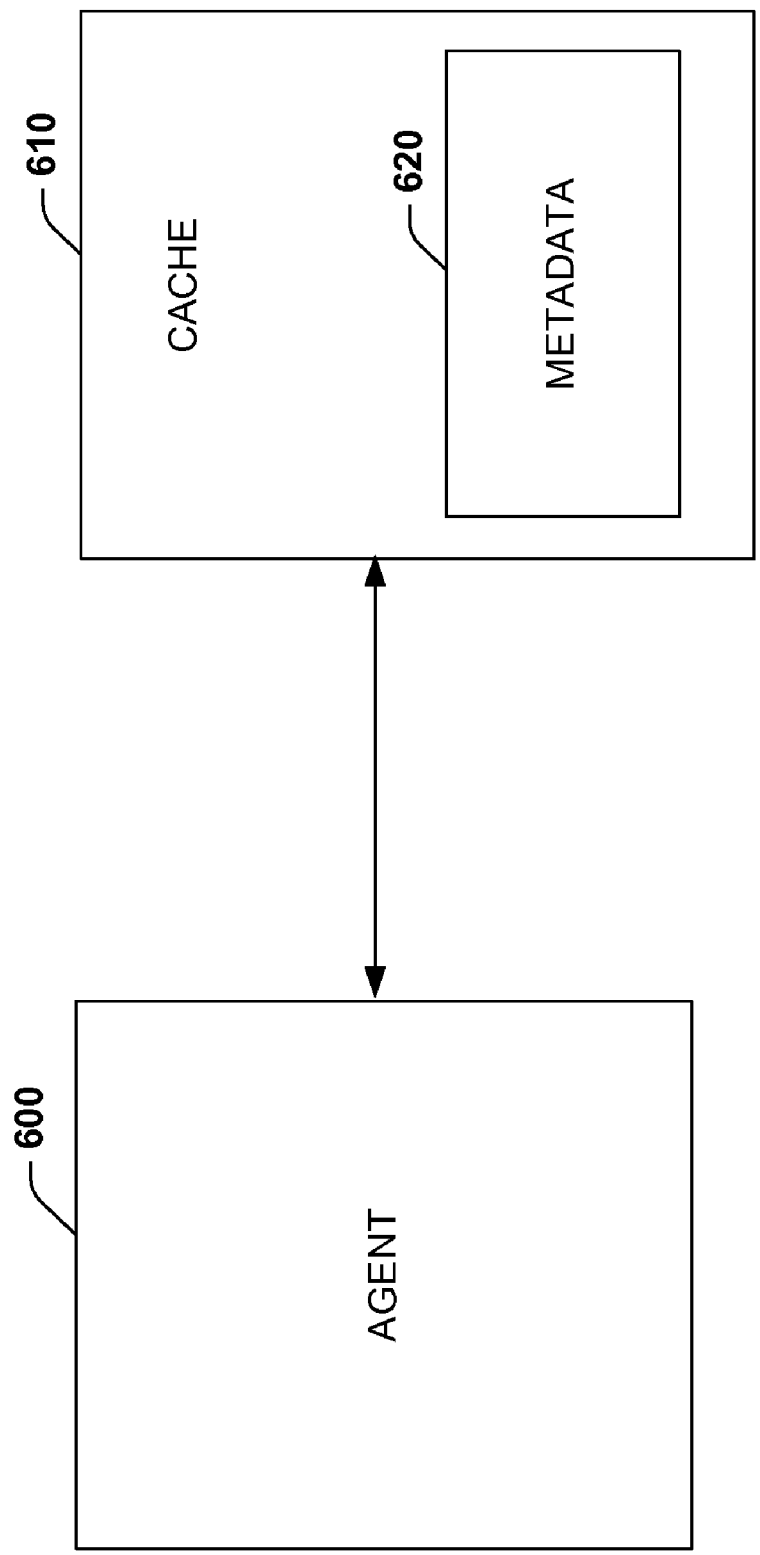
FIGS. 6-8 illustrate alternative processing aspects related to re-try operations.

Turning to FIG. 6, example agent aspects 600 are considered. In general, the agent 600 maintains an in-memory cache 610 of metadata 620 storing file/directory information that was recently opened through an SIAC component described above. For performance reasons, the cache 610 may employ memory writes so if a client application changes file metadata 620, these changes are not immediately saved to the database. Instead, new metadata may be stored as a cache entry at 620 and saved to the database when the handle is closed (e.g., some changes are reflected to the database only when the last handle for this file/directory is closed). For example, if a client application opens a file and sets the hidden attribute on a file (using Set Information File API), new attributes of this file will be visible through the SIAC interface. Any application that uses an SBAC API will see the old version of attributes until the first application closes its handle. At this point, new file attributes get saved into the database and are visible through SBAC API.

Similar considerations are true not only for file attributes, but for timestamps and file/allocation size properties, for example. Another example is delete file. According to file system semantics, an actual delete operation can be delayed until the last handle for the file being deleted goes away which makes the delete logic similar to the logic of handling metadata changes. This approach has significant performance benefits. However, since components do not prevent other clients from accessing the same item through an SBAC API for read (updates and deletes through SBAC API are disallowed if there are opened handles, but selects are not), there is generally not a guarantee that the item being modified (or deleted) through SIAC is updatable at the time of a close handle operation. Thus, this may lead to the following inconsistencies which are accounted for in the re-try components and processes described in FIGS. 7 and 8:

| Inconsistency | Impact |
| --- | --- |
| Archive attribute and Last Access Time/Last Modification Time implicitly modified by Agent according to the file system semantics do not get preserved in the database. | May confuse end-users when they search for recently modified files and do not see the file that they know for sure was recently modified. |
| File attributes/timestamps explicitly modified by a SIAC client do not get preserved in the database. | May confuse legacy SIAC applications that expect to see the changes they recently made. |
| A delete operation performed by a SIAC client is lost and the file remains in the namespace until it is deleted | May confuse end-users and/or legacy SIAC applications that do not expect to see the file/directory since they recently deleted it. |
| Changes in File Size/Allocation Size properties do not get preserved in the database. | This may create a mismatch between the information about file size stored in the database and the actual file size. |

Figure 7:
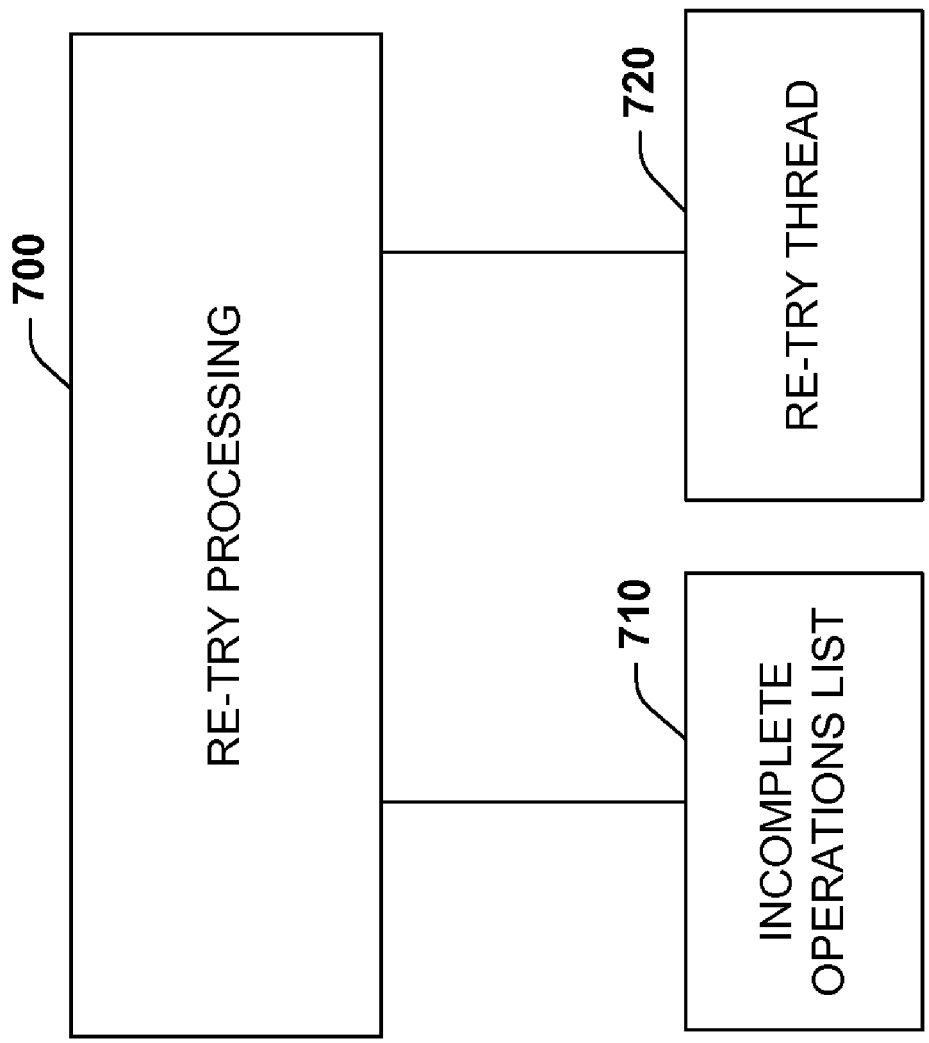

Referring to FIG. 7, example re-try processing considerations 700 are illustrated. The re-try processing 700 is provided to account for inconsistencies between SIAC and SBAC components such as how and when files or directories are closed during respective processing by the SIAC or the SBAC. In general one or more re-try processing components can be provided that include an incomplete operations list 710 and a background "retry" thread 720 that periodically scans the list of incomplete operations 710 and attempts to complete items on the list over time.

With respect to the incomplete operations list 710, when the agent tries to update information in a database and fails, it allocates an in-memory structure describing the operation to be completed and inserts it into a global list, where entries on the list 710 can include the following information:

Database this operation should be performed on.
Item ID of the item to update/delete.
Type of the operation (update or delete).
Properties to update (for update operations).
Time of the next attempt to complete.

With respect to the re-try thread 720, a background retry thread executes every 1 sec (or other predetermined time frame), scans the list of incomplete operations and checks if it is the time to retry the given operation. If the operation completes successfully, the corresponding entry is removed from the incomplete operations list 710. If the operation fails, the time of the next attempt is updated according to the schedule below and the background thread 720 moves to the next entry in the list. Retries should happen in 1, 2, 5, 10 and then every 30 seconds until the operation succeeds. As can be appreciated, other timeframes for re-try can be designated.

Figure 8:
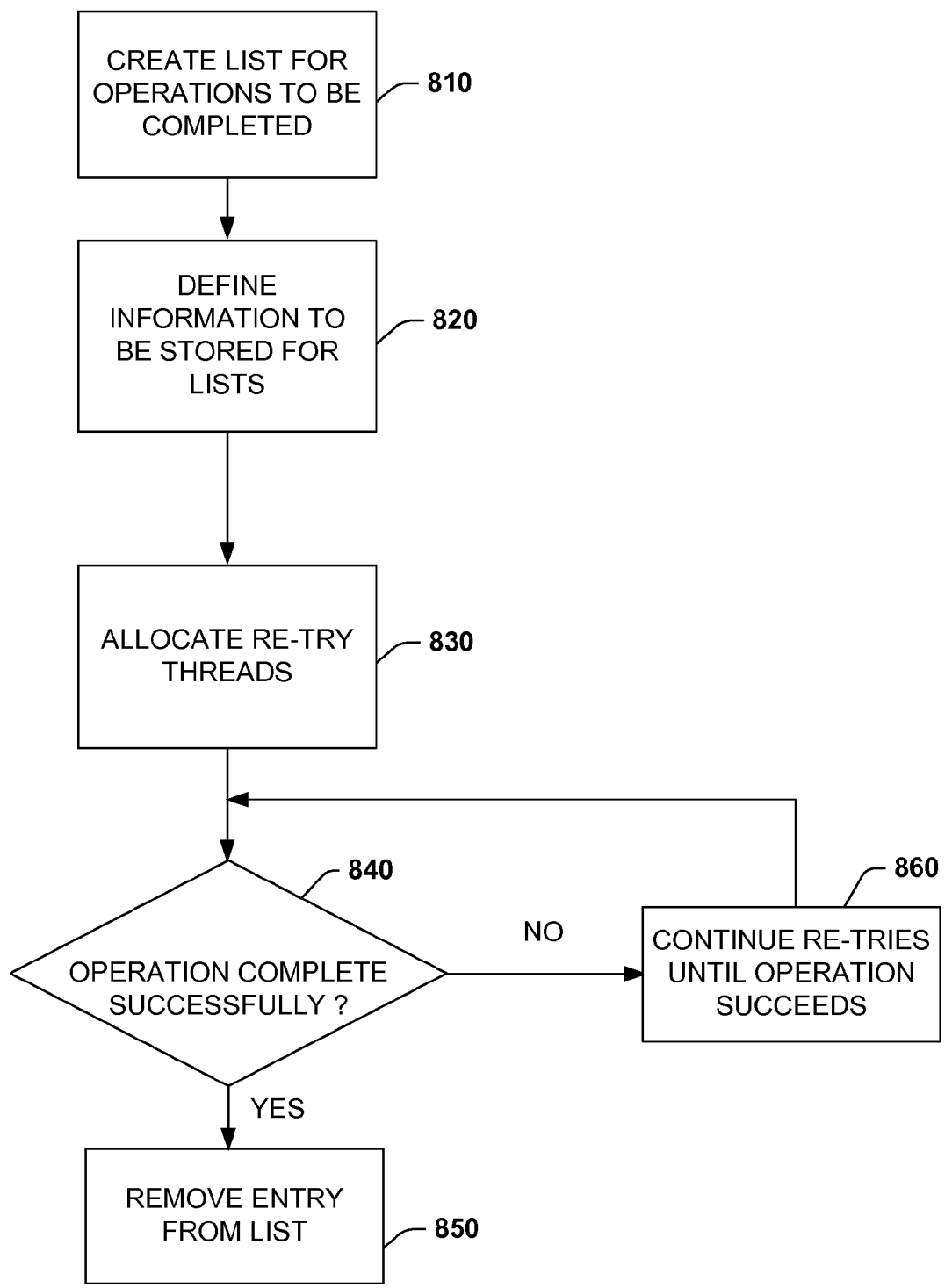

Turning to FIG. 8, an example re-try process 800 is illustrated. Similar, to FIG. 2 above, acts can be executed in different orders that shown in FIG. 8. At 810, a list is created for operations that have still yet to be completed. Thus, when an agent attempts to update information in a database and fails, it can create an in-memory structure describing the operation to be completed and inserts the operation into the list. At 820, entries on the list can have various data associated there with including: Database this operation should be performed on; Item ID of the item to update/delete; type of the operation (update or delete); Properties to update; and Time of the next attempt to complete, for example. At 830, one or more retry threads can be provided that executes at predetermined time frames. Such threads scan the list of incomplete operations and determine if it is the time to re-try the given operation. If the operation completes successfully at 840, the corresponding list entry is removed from the incomplete operations list at 850. If the operation fails at 840, the time of the next attempt is updated according to differing times as previously noted and the thread moves to the next entry in the list at 860. Retries should continue at 860 in 1, 2, 5, 10 and then every 30 seconds, for example, until the operation succeeds at 850.

Figure 9:
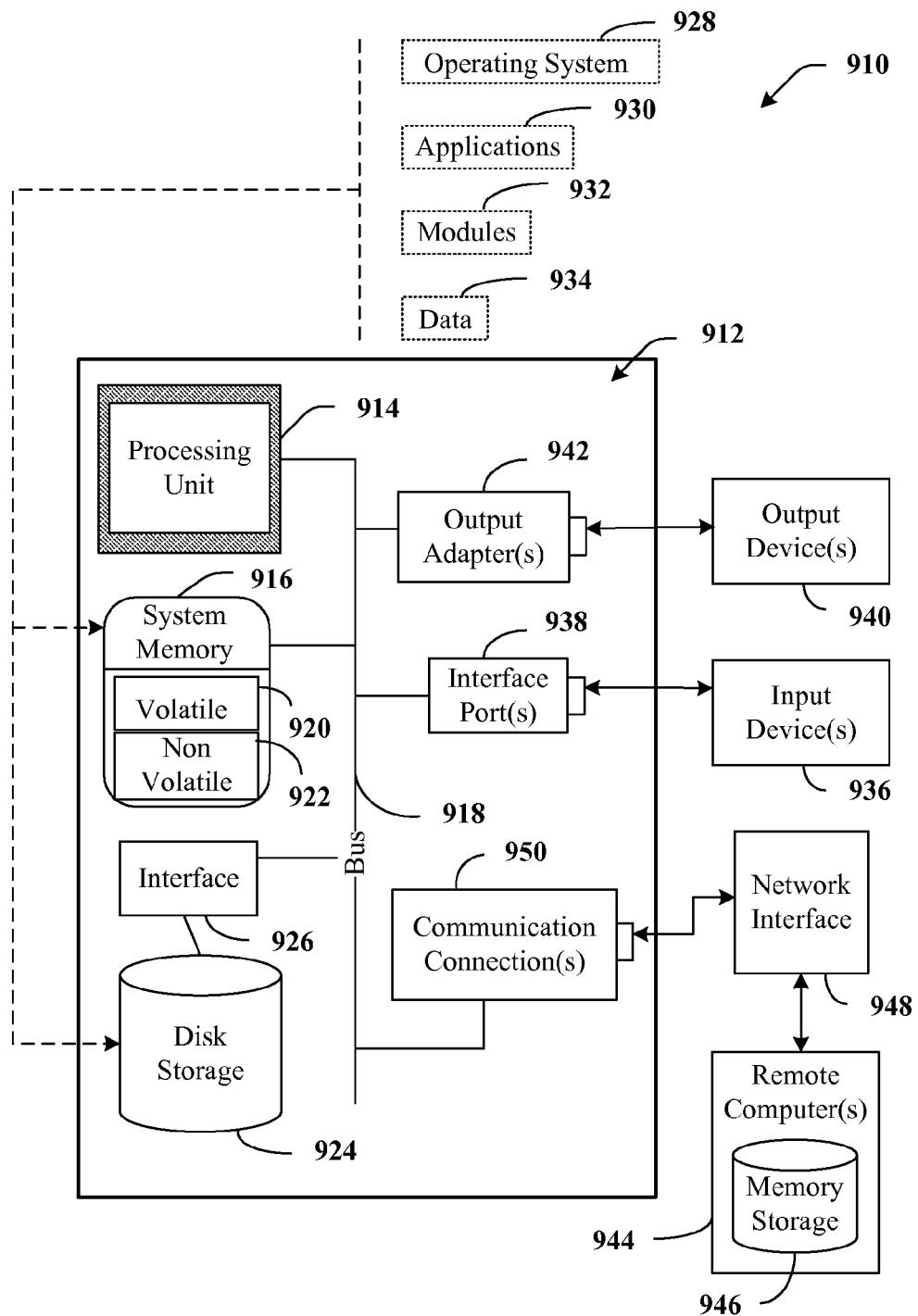
FIG. 9 is a schematic block diagram illustrating a suitable operating environment.
Figure 10:
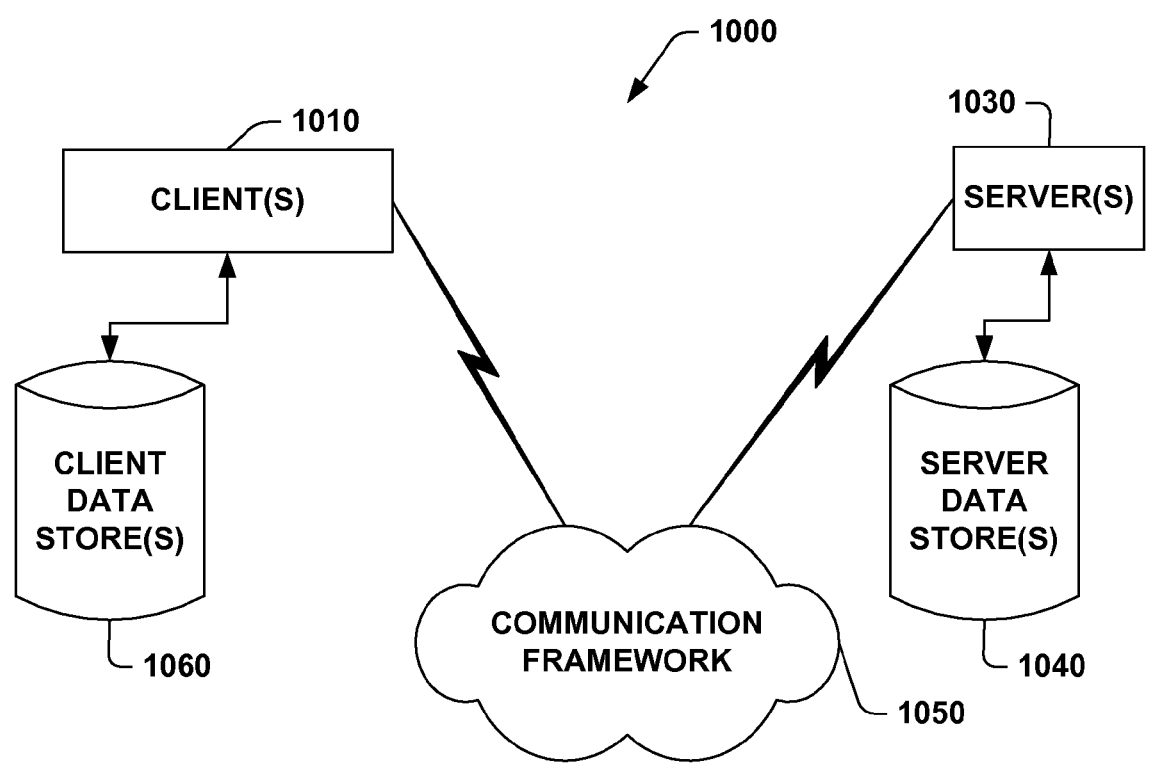
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/ or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An operating system for processing kernel mode requests from user mode applications, the system comprising:
. . .
a computer comprising at least one processor and system memory;
an agent component which
monitors computer activities between one or more single-item access components (SIAC) and one or more set-based access components (SBAC),
the agent controlling how data access is controlled, denied, and allowed, and the agent controlling how files and directories are opened, closed, saved, and moved,
the agent maintaining an in-memory cache of metadata storing file and directory information that was recently opened through the one or more SIACs,
wherein an SIAC is a handle-based component which can process only a single data item at a time, and
wherein an SBAC is a component which allows concurrent access to multiple data items; and
an interface component which provides a bridge between processes that are operative in user mode and processes that are supported or generated in kernel mode,
the interface component concurrently supporting a plurality of application programming interfaces (APIs), at least one API supporting legacy SIACs and at least one API supporting modern SBACs, the interface component receiving kernel mode requests and passing them on to user mode components for subsequent processing;
wherein the SIAC components are associated with a handle based operating system; and
wherein the SBAC components are associated with an operating system having relational database memory storage capability.

2. The system of claim 1, wherein the computer activities are associated with memory updates to one or more data items.

3. The system of claim 2, wherein the data items are associated with single memory locations, arrays, files, directories, names, applications, relational database structures, objects, classes, methods, or functions.

4. The system of claim 1, wherein the agent component provides serialization or synchronization logic between one or more data access operations.

5. The system of claim 4, wherein the data access operations include save operations, create operations, delete operations, or close operations that are associated with file or directory access.

6. The system of claim 1, further comprising a File control Block or a Link Control Block to support the agent component operations.

7. The system of claim 1, wherein the agent component further comprises a rules component having one or more rules to control memory access.

8. The system of claim 7, wherein the rules are associated with a cache invalidation procedure.

9. The system of claim 1, wherein the agent component processes one or more item identifiers.

10. The system of claim 1, wherein the agent component includes a get item component, a move item component, and a pointer to a parent structure, or a null component for a root structure.

11. The system of claim 1, wherein the agent component includes a cache component to process one or more metadata items.

12. The system of claim 11, wherein the agent component includes one or more processing components to perform a regular item open, an open by item identifier, or an invalidate cache entry.

13. The system of claim 1, further comprising at least one re-try component that includes an incomplete operations list and at least one re-try thread.

14. The system of claim 13, wherein the incomplete operations list includes at least one of a database identifier, an Item ID, an operation type, one or more properties to update, and a time for a next attempt to complete.

* * * * *